J. F. MURPHY.
LEAF SPRING LUBRICATOR.
APPLICATION FILED APR. 28, 1919.
1,365,119. Patented Jan. 11, 1921.
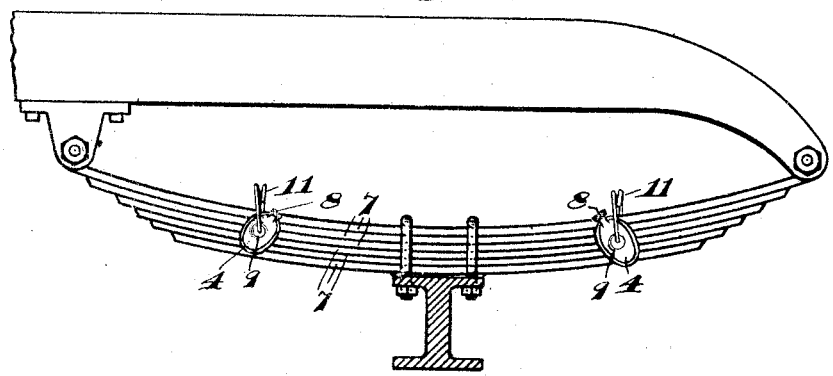
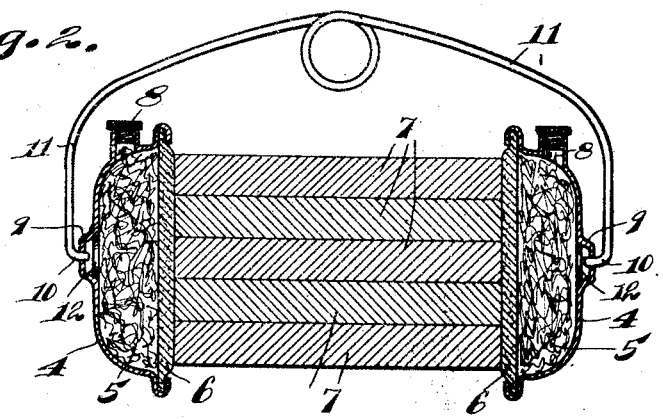
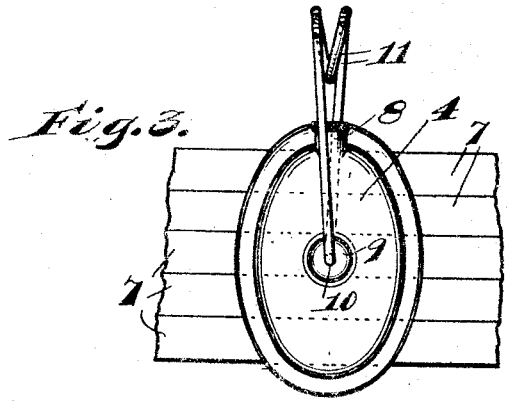
Witnesses:
C. E. Wessels
B. J. Richards
Inventor:
James F. Murphy,
By Joshua R. H. Potts,
Attorney.

UNITED STATES PATENT OFFICE.

JAMES F. MURPHY, OF CHICAGO, ILLINOIS.

LEAF-SPRING LUBRICATOR.

1,365,119.  Specification of Letters Patent.  Patented Jan. 11, 1921.

Application filed April 28, 1919. Serial No. 293,215.

*To all whom it may concern:*

Be it known that I, JAMES F. MURPHY, a citizen of the United States, and a resident of the city of Chicago, county of Cook, and State of Illinois, have invented certain new and useful Improvements in Leaf-Spring Lubricators, of which the following is a specification.

My invention relates to improvements in leaf spring lubricators, and has for its object the provision of an improved construction of this character which is simple and efficient in operation, and which may be readily applied to leaf springs of varying sizes.

Other objects will appear hereinafter.

The invention consists in the combinations and arrangements of parts hereinafter described and claimed.

The invention will be best understood by reference to the accompanying drawings forming a part of this specification, and in which, Figure 1, is a side view of a leaf spring illustrating the use of the lubricator, Fig. 2, a transverse section through a lubricator, and Fig. 3, a side view corresponding with Fig. 2.

The preferred form of construction, as illustrated in the drawings, comprises two lubricator casings 4, made of sheet metal and filled with waste or other fibrous or absorbent material 5, as indicated. Each of the casings 4 is closed at its inner side by means of a contact piece 6 of felt or other absorbent material. Each of the casings 4 and contact pieces 6 is made oblong in shape and adapted to fit against the opposite edges of the leaves 7 of an ordinary vehicle leaf spring as indicated, said casings being applied to opposite sides of said spring. The contact pieces 6 are secured in place by pinching or compressing inwardly turned flanges on the casings 4 over the edges thereof, thus compressing said edges somewhat and causing the bodies of the contact pieces to project outwardly beyond the edges of the casings, thus insuring good contact at all times. Each of the casings is provided with an oil tube 8 having a removable plug for supplying oil to the interior thereof, and a centrally perforated boss 9 on its outer side. Inwardly turned ends 10 of a coiled spring clip 11 are arranged to be inserted in the perforations in the bosses 9 to hold the lubricating devices in operative positions on opposite sides of a leaf spring as shown, a suitable sealing plate or washer 12 being inserted in said bosses and held in place by the absorbent filling 5 to prevent escape of oil through said perforations.

In use, two of the lubricating devices are applied to opposite sides of a spring and held in place by means of one of the spring clips 11 arranged as shown. Where applied to a light or small spring, the casings 4 are adjusted angularly, with their smallest dimensions corresponding with the height or thickness of the spring. Where the spring is heavier and of greater thickness, the casings are angularly adjusted until their contact pieces 6 span the full height or thickness of the spring, thus adapting the device for application to springs of various weights or thicknesses.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A leaf spring lubricator comprising two oil casings provided on their outer sides with centrally perforated bosses; a sealing plate in each of said bosses; absorbent material filling said casings and holding said sealing plates in place; an absorbent contact piece on each of said casings; and a spring clip adapted to embrace a leaf spring having inwardly turned ends adapted to be inserted in the perforations in the bosses on said casings, substantially as described.

2. A leaf spring lubricator comprising two oil casings provided on their outer sides with centrally perforated bosses; a sealing plate in each of said bosses; absorbent material filling said casings; an absorbent contact piece on each of said casings and oblong in shape; and a coiled spring clip adapted to embrace a leaf spring and having inwardly turned ends adapted to be inserted in the perforations in the bosses on said casings, substantially as described.

3. A leaf spring lubricator, comprising an oil casing having an open side provided with an inwardly turned securing flange; and an absorbent contact piece arranged across the open side of said casing and having its edges compressed under said flange to cause the body thereof to project outwardly beyond the flange, substantially as described.

4. A leaf spring lubricator, comprising an oil casing open at one side and having an inwardly turned securing flange around the edges of said opening; an absorbent contact piece arranged across the open side of said casing and having its edges compressed under said flange to cause the body thereof to project outwardly beyond the flange; and means for adjustably securing said casing against the side of a leaf spring with said contact piece contacting with the edges of said spring leaves, substantially as described.

In testimony whereof I have signed my name to this specification in the presence of two subscribing witnesses.

JAMES F. MURPHY.

Witnesses:
  JOSHUA R. H. POTTS,
  HELEN F. LILLIS.